April 10, 1956   B. W. HUBBARD   2,741,014
ROLLER
Original Filed Sept. 9, 1950

INVENTOR
Bruce W. Hubbard
By Carlson, Pitzner, Hubbard & Wolfe
ATTORNEYS

United States Patent Office 2,741,014
Patented Apr. 10, 1956

2,741,014

ROLLER

Bruce W. Hubbard, Oak Park, Ill., assignor to Ideal Roller and Manufacturing Company, Chicago, Ill., a corporation of Illinois Continuation of abandoned application Serial No. 183,981, September 9, 1950. This application June 21, 1954, Serial No. 438,173

1 Claim. (Cl. 29—130)

This invention relates to a roll or cylinder comprising a layer or core of soft material surrounding and secured to a supporting shaft and covered with an impervious relatively thin layer of yieldable material such as rubber.

The primary object is to provide a simple and effective covering over the ends of a roll of the above character so as to prevent deteriorating liquids from coming into contact with the core material while at the same time permitting free radial flexing of the end portions of the roll.

A more detailed object is to construct the covered roll ends in a novel manner such as to prevent stressing of the covering at its junction with the supporting shaft.

Other objects and advantages of the invention will become apparent from the following detailed description taken in connection with the accompanying drawings, in which Figure 1 is an elevational view of a roll embodying the novel features of the present invention.

Figure 1:
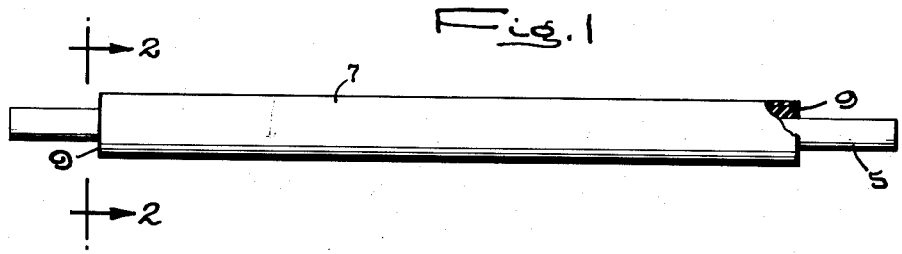
Figure 2:
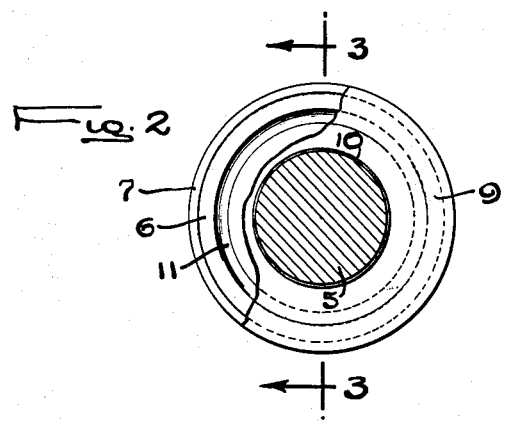
Fig. 2 is a sectional view taken along the line 2—2 of Fig. 1.
Figure 3:
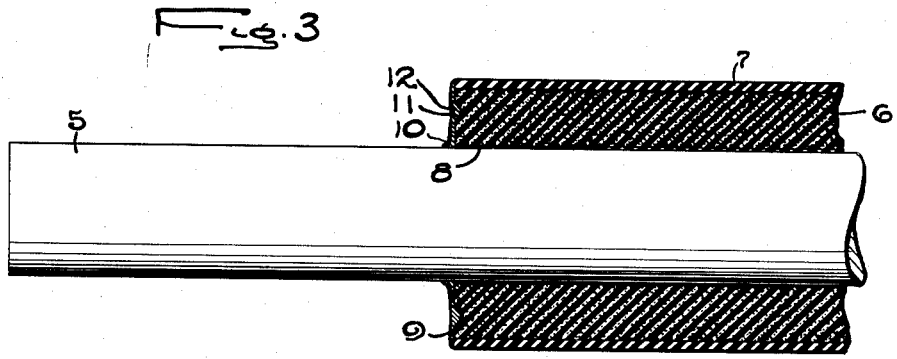
Fig. 3 is a fragmentary longitudinal section taken along the line 3—3 of Fig. 2.

The roller shown in the drawing to illustrate the present invention comprises a supporting shaft or spindle 5 covered intermediate its ends with a relatively thick layer 6 of soft rubber material which, for example, may be so-called foam rubber having small air cells distributed uniformly throughout a body of natural or synthetic rubber. The layer forms a very pliable base or core imparting the desired softness to the outer roll surface which is formed by a relatively thin impervious skin or sleeve 7 of yieldable material such as natural or synthetic rubber. This sleeve may be formed and vulcanized separately and then stretched over the core 6 to which the sleeve is secured by a suitable cement.

When the core layer 6 is composed of foam rubber, it may be formed by casting liquid latex foam within a cylindrical mold and around the shaft 5 after covering of the latter with a coating 8 of unvulcanized material such as a rubber cement by which the core becomes bonded securely to the shaft. Curing of the core and bonding material may be effected in a single heating after the liquid foam rubber has solidified by the action of well known coagulating ingredients incorporated in the latex prior to heating the latter to incorporate the air cells therein.

To exclude liquid or other materials from contacting or working into the ends of the core structure and clogging the pores or otherwise deteriorating the foam rubber, the entire end surfaces from the surface of the shaft to the outer surface of the sleeve 7 are covered by a thin impervious film 9 which will flex readily in an edgewise direction as an incident to inward and outward flexing of the roller surface.

While this film, which is about $1/32$ to $1/16$ of an inch thick, may be formed from various yieldable materials, a synthetic rubber material known to the trade as "Thiokol" may be used advantageously. This material, which is prepared by the reaction of ethylene dichloride and sodium tetrasulphide, is sold in the form of a liquid which, after incorporating a suitable vulcanizing agent such as lead peroxide, polymerizes slowly and eventually solidifies but remains very flexible. The liquid may be flowed onto the end surface of the core while the roller is standing on end and spread over the entire area forming a small fillet 10 adjacent the shaft surface where the film is somewhat thicker. Setting of the film may be accelerated by the application of radiant heat.

The film 9 becomes securely bonded to the end surfaces of the core 6 and the sleeve 7 but does not adhere to the shaft surface firmly enough to resist breaking of the joint where the stresses tend to concentrate during edgewise flexing of the film. The present invention contemplates a novel construction of the film 9 to localize the bending stresses incident to radial depression of the roller surface over an area of the film spaced outwardly and away from the surface of the shaft. For this purpose, the roller end or the film or both are formed intermediate the inner and outer peripheral edges with an annular deformation of such shape as to force the bending of the film to occur only at points spaced outwardly from the shaft. Herein, the deformation is an outwardly opening shallow groove 11 formed in the end of the roller core 6 and receiving a complemental inwardly projecting rib 12 which is cast on the film 9 during formation of the latter in the manner described above. The groove 11 extends continuously around the roller end preferably about midway between the shaft surface and the sleeve 7 and, in the present instance is about $1/16$ of an inch deep. After the end of the core 6 is trimmed or squared, the groove 11 may be cut with the aid of a power driven wire brush or grinding wheel of the proper surface contour. When the coating of the relatively thick but liquid film material is applied to the core surface thus grooved, the liquid will flow into the groove to form the rib 12 leaving only a shallow annular depression in the outer surface of the film 9. A simple and inexpensive method is thus provided for forming the desired deformation in the roller end.

Figure 4:
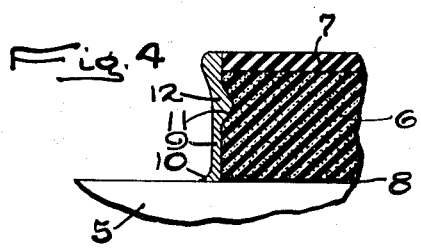
Fig. 4 is a similar view with the end portion of the roller depressed.

With the end films 9 thus constructed, radial depression of the roller surface adjacent the end of the sleeve as shown in Fig. 4 will bend the extreme end of the sleeve inwardly toward the shaft and outwardly slightly along the latter, but only the outer peripheral portion of the film will be flexed laterally about the bottom of the groove 11 as a fulcrum. The portion of the film between the groove and the shaft 5 remains substantially unflexed or compressed radially as a result of which there is little tendency to break the inner film edge away from the surface of the shaft. This relatively weak joint thus remains intact during normal flexing of the roller surface in service use thus effectually excluding liquids or materials from contacting the core. The service life of the roll is thus greatly extended.

This application is a continuation of my prior application Serial No. 183,981, filed September 9, 1950, now abandoned.

I claim as my invention:

A roller comprising an elongated shaft, a tubular core of soft rubber material surrounding and secured to said shaft intermediate the ends of the latter, a sleeve of solid flexible material and cylindrical form throughout its length coextensive with said core and covering the outer periphery thereof, opposite end surfaces of said core being disposed substantially at right angles to the shaft axis and having a shallow annular groove formed therein radially spaced outwardly from the outermost surface of said shaft, and protective films of flexible material covering said core ends and the adjacent exposed portions of said shaft and following the contour of said groove, said groove acting, during radial compression of the extreme end portions of said sleeve, to prevent flexing of said films at the junction thereof with said shaft.

References Cited in the file of this patent

UNITED STATES PATENTS

| 1,458,629 | Raymond | June 12, 1923 |
| 2,430,560 | Elliott | Nov. 11, 1947 |
| 2,625,735 | Hitov | Jan. 20, 1953 |